Jan. 18, 1944. E. H. McKAY 2,339,418
CEREAL FOOD
Filed Aug. 31, 1940 2 Sheets-Sheet 1
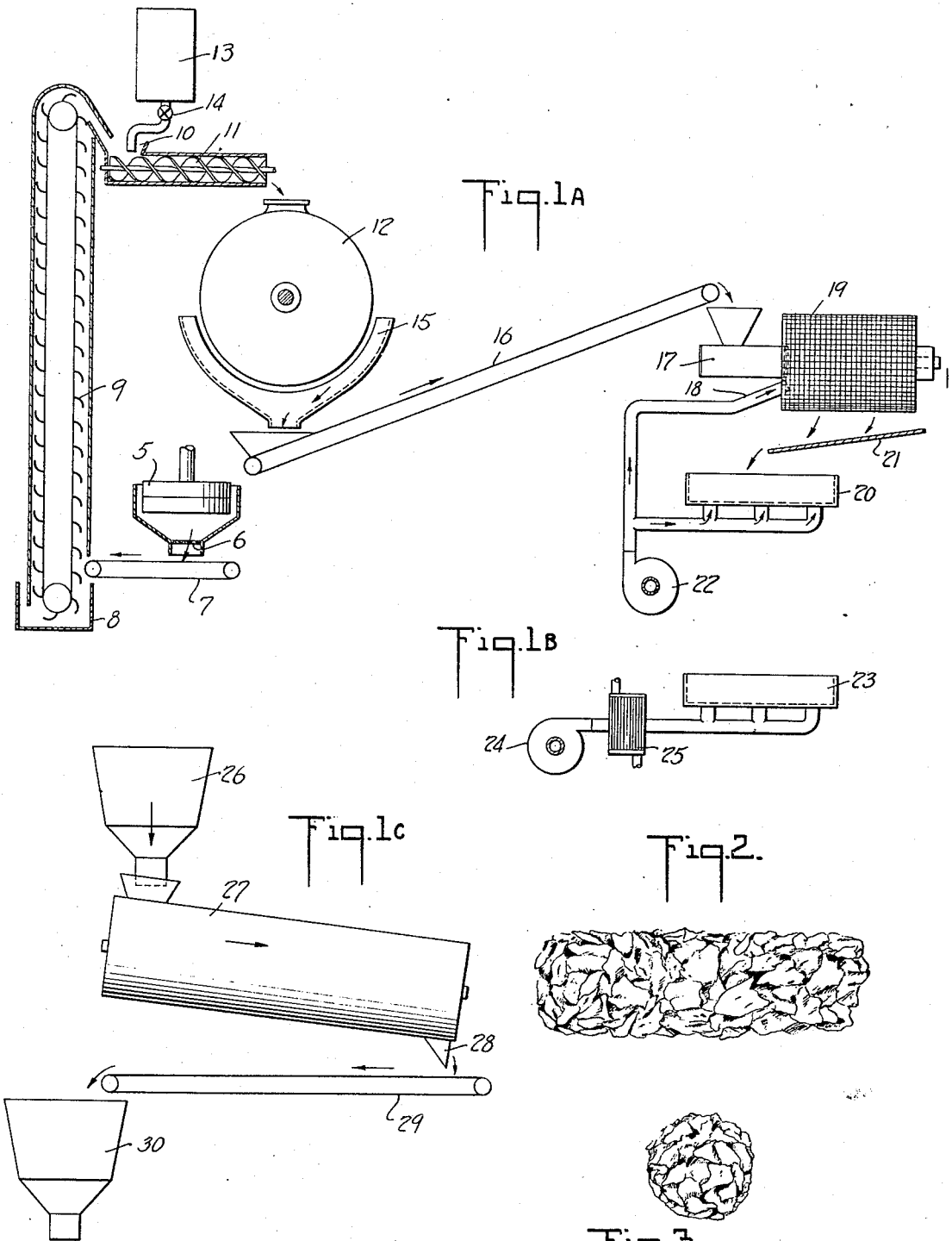

Jan. 18, 1944.        E. H. McKAY        2,339,418
CEREAL FOOD
Filed Aug. 31, 1940        2 Sheets-Sheet 2
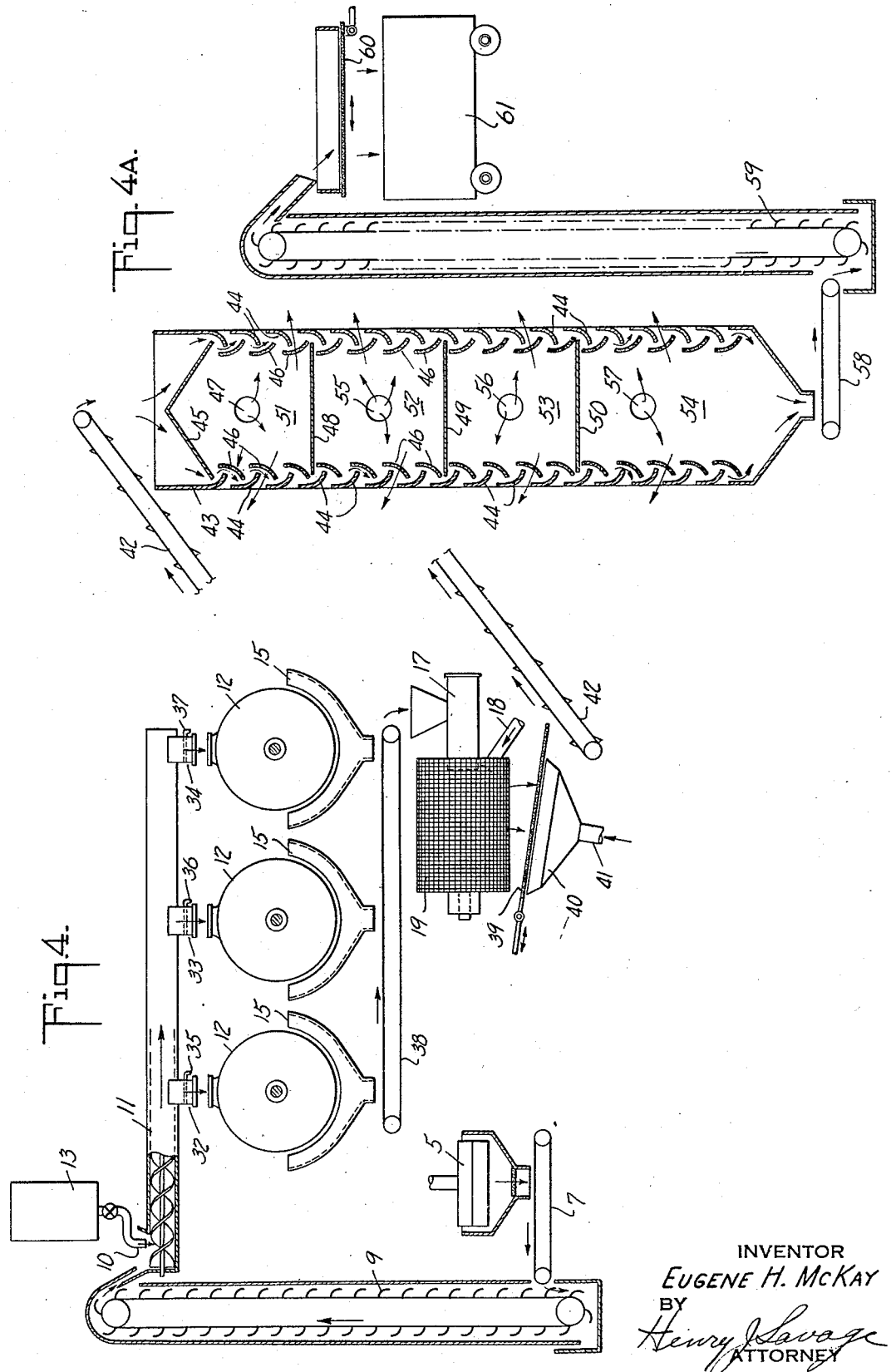
INVENTOR
EUGENE H. McKAY
BY
Henry J. Savage
ATTORNEY Patented Jan. 18, 1944

2,339,418

UNITED STATES PATENT OFFICE 2,339,418

CEREAL FOOD

Eugene H. McKay, Battle Creek, Mich., assignor to National Biscuit Company, New York, N. Y., a corporation of New Jersey Application August 31, 1940, Serial No. 354,933

8 Claims. (Cl. 99—83)

My invention relates to cereal foods and particularly to a cereal food formed basically from bran and to the method or process for producing it.

Heretofore the beneficial effects of wheat bran added to the diet have been quite generally recognized both by the medical profession and the laity, but its use has been comparatively limited because of its unpalatableness and the fact that it is irritating to the intestinal tract of many persons. The unpalatability of bran is largely due to the fact that it sticks in the mouth, becomes soggy almost immediately upon contact with saliva, milk or other liquid, and cannot well be eaten alone but must be mixed with other cereals or foods. Its irritating effect is due principally to the coarseness of the bran and the harder fibers that do not readily soften under the effect of moisture or digestive juices.

By means of the present invention, I produce a cereal food composed basically of fine particles of bran coated with and bound together with an edible temporarily moisture resistant coating material that remains crisp and crunchy for a considerable time when immersed in cream, milk or other liquids and is itself palatable and appetizing both in texture and appearance so that it is relished when eaten alone. Yet the bran after being masticated, or after a short period of contact with a liquid quickly absorbs moisture to a considerably greater degree than bran and bran foods heretofore available. This greater amount of absorbed moisture keeps the bran soft and non-irritating and materially enhances its laxative effect. I produce this superior bran food by the process hereinafter described and with apparatus that is illustrated more or less diagrammatically in the accompanying drawings wherein:

Figs. 1—A, 1—B, and 1—C are a diagrammatic lay-out of apparatus that may be used in carrying out my process and producing my improved bran.

Figs. 2 and 3 are side and end elevators, greatly enlarged, of one form in which the bran food may be prepared.

Figs. 4 and 4—A constitute a diagrammatic view of automatic apparatus for carrying out the process up to the toasting operation.

The present invention permits the product to be prepared in various forms and also permits considerable range in the ingredients and their proportions. I prefer to make the product in the form of small pellets of generally cylindrical shape, but it can be made in other forms. I have found pellets of about $\frac{3}{32}$ to $\frac{1}{8}$ inch diameter and $\frac{1}{8}$ to $\frac{3}{8}$ inch in length to be very satisfactory, but they may be of much larger or smaller size, if desired, and I do not limit my invention to any one definite size of pellet.

Bran is a by-product of the process for milling wheat and is produced in relatively large flakes. It is these flakes that have been used in bran foods heretofore. I do not use these large flakes in my product but first subject them to a second milling process which thoroughly disintegrates them and reduces them to relatively small size. This double milling makes the bran finger, softer and more absorbent of water. The bran may be ground by any suitable means as mill stones, hammer mills, shredders and other types. I continue the milling until all the particles will pass through a fine screen, of say $\frac{3}{64}$ to $\frac{5}{64}$ in. mesh. When a $\frac{3}{64}$ inch or No. 3 screen is used for gauging the size of the particles, I find that they vary from very fine up to a maximum of the screen size, and that the proportions of the different sized particles as determined by a screen test are about as follows:

| Size of screen | Per cent passing through |
|---|---|
| 20 mesh | 100 |
| 40 mesh | 65 |
| 60 mesh | 45 |
| 80 mesh | 35 |
| 100 mesh | 30 |

These proportions vary considerably depending upon many factors including the condition of the bran, the kind of wheat from which it is produced, time of milling, etc. However, this is a typical specimen.

When the bran has been double-milled to size, it consists of very fine particles and fibers that have a much greater affinity for moisture than the original bran flakes. In order to make this bran palatable and temporarily to curb its moisture absorbing proclivity, I coat the particles with a binding material which causes them to stick together so that they may be formed into pellets or other forms and renders them temporarily moisture resistant. The binding material usually is incorporated in a flavoring solution which is mixed with the finely milled bran, the mixture then cooked, formed into pellets and toasted. These toasted pellets are very crisp and crunchy and remain so when covered with milk or cream for a long enough time that a serving may be eaten before the crunchiness is lost. The flavoring material adds to the crispness and makes the pellets delicious when eaten alone. They need not be mixed with any other food. The coating material on the bran is of high food value and soluble in water. When the pellets are crushed by mastication, the coating is broken and the bran particles completely exposed to moisture which they now absorb readily and retain during their passage through the digestive tract. Bran prepared by my process will absorb up to 3½ times its weight of water. Many edible water resistant coating materials may be used for binding the bran particles together in the pellets, and while I prefer to use binding materials such as sugars, fruit syrups and malt extract because of the agreeable flavor that they impart to the product, other suitable materials including, for example, honey, gelatine, starches and agar agar may be used, the essential thing being an edible binding material that will bind the bran together sufficiently to enable the pellets to be formed, yet will withstand the toasting temperature in the oven and retard the absorption of water by the bran, and where I use specific terms or refer to specific substances that are used as binding and flavoring materials, it will be understood that these are but illustrations and not limitations on the scope of the invention. While many different ingredients and proportions may be used, the following formula, based upon 100 parts of bran by weight, gives very good results—

| | |
|---|---|
| Finely milled bran | 100 |
| Fruit juice | 2 to 4 |
| Malt extract | 1 to 3 |
| Sucrose | 5 to 12 |
| Salt | 2 to 3 |
| Water | 60 to 90 |

All of these parts are by weight. Fruit juices of many kinds and in different forms, such as plain juices, concentrates and syrups, can be used and I have found juice of prunes, raisins, or apricots or mixtures of juices to be satisfactory. In some cases I have omitted the malt extract and the resulting product is entirely satisfactory but of course, does not have the characteristic malt flavor that is so popular at this time in toasted cereals, and the fruit juice or sucrose must be increased slightly to compensate for the binding effect of the malt if the hardness and resistance of the pellets is to be kept the same. The amount of sugar can be varied within considerable limits, but five parts by weight seems to be about the minimum unless the fruit juices be considerably increased. More than 12 parts increases the hardness and moisture resistance of the pellets beyond the point of greatest desirability. In general, the greater the proportion of sugar, the greater the hardness and moisture resistance. In the preferred formula, the sugar is supplied in part as such and in part from the fruit juices. But the entire sugar content may be sucrose or it may come entirely from the fructose of the fruit syrup, if only fruit juices be used and the sucrose omitted; or any of the other forms of sugar, as dextrose and levulose, may be used in whole or in part.

In preparing the product, the coating materials including the flavoring may be added to the bran separately and then mixed, but I prefer to form a thin syrup by dissolving the coating and flavoring ingredients in the water and then mix the solution with the bran.

After thorough mixing, the mixture in batches of suitable size is placed in a steam pressure cooker where it is rotated slowly and cooked under a steam pressure of 15 to 20 lbs. for 30 minutes to 1 hour, the time of cooking depending upon the steam pressure and the degree of cooking wanted.

After cooking, the bran and flavoring, now loosely adhering in masses of varying size, is dumped from the cooker and passed, preferably while hot, through an extruding machine from which it emerges in long strings of closely compacted tiny bran particles which are coated and agglutinated by the coating and flavoring materials. These strings are of proper diameter or cross section for producing pellets of the size wanted, and as they emerge from the extruding machine are broken up into short lengths, usually not exceeding ¼ inch. These freshly cooked soft pellets now contain considerable moisture, usually about 40% and must be dried until the moisture is reduced to approximately 10% or less. They they are toasted at a temperature of 350 to 450 degrees for from 2½ to 5 minutes which hardens or candies the sugar, fruit juices and malt (or other binding material) and makes the pellets crisp and crunchy. Cooling finishes the product and it is then ready for packaging, preferably in moisture proof containers to preserve its crispness.

In the drawings, I have shown diagrammatically two ways in which equipment may be arranged and operated to carry out my process and produce the product. In the first lay-out, the process is begun in the apparatus of Fig. 1—A, then continued in 1—B and completed in 1—C. When the apparatus is separated into these three sets, the process will be accomplished in three stages, but this is only illustrative, and my invention includes a continuous process from the beginning through to the completed article, and a two-step process as shown in Figs. 4, 4—A.

In Fig. 1—A, 5 indicates a mill that may be utilized for the second or fine milling of the bran. A burr mill is indicated but a hammer mill or other grinding means may be used. I prefer to use bran as it is produced from the flour milling process free from flour and having a fiber content of approximately 10%. It is fed to the mill 5 and re-milled until it passes through the screen 6 which holds back all coarse particles and lets through only particles and fibers of no greater dimensions than the screen perforations, usually 3/64 to 5/64 inch.

After this double-milling, the bran is ready for the addition of the binding and flavoring solution and the cooker. The mill 5 need not be associated with the other mechanism but may be located at the flour mill or in any other place. I have shown it delivering to a conveyor 7 which in turn leads to a bin 8 from which the bran is delivered by a bucket conveyor 9 to the hopper 10 of a screw-feed mixer 11 which in turn delivers to a pressure cooker 12. The flavoring solution in a reservoir 13 is fed through a control valve 14 into the hopper 10 and is thoroughly mixed with the bran on its passage through the mixer 11. Of course, the conveyor 9 and mixer 11 may be omitted and a complete batch mixed in a separate mixer, then loaded into the cooker 12. But the apparatus as illustrated saves considerable labor and the process can be substantially continuous when two or more cookers are used.

When the cooker 12 has received a full batch, which may vary from 100 to 1000 pounds of bran depending on the size of cooker, the cooker is closed, steam turned on, and the cooker rotated slowly for from 30 minutes to 1 hour. When the cooking is completed, the bran is somewhat sticky or tacky and may be dumped into a curved trough 15 from which it is carried by a conveyor 16 to an extruding machine 17. In the absence of the conveyor 16, as when only a single cooker is being used, the cooked mass will be fed from the cooker to the hopper of the extruder 17 by hand.

The extruder may be of any suitable type adapted to compress and extrude the cooked product under high pressure in the form of strings. I have found a screw feed machine with a perforated outlet plate to give good results. Also a pair of grooved rollers running in close contact, similar to rollers used for extruding other food products, may be used.

The strings, as they come from the extruder, are somewhat tacky and tend to adhere wherever they touch. To prevent this, and also to break them up into short lengths, I direct a blast of air from a nozzle 18 into the mass of strings as they leave the extruder. This keeps them separated and largely suspended in the air blast which breaks them to some extent as they fall inside a rotating cylindrical screen or tumbler 19. This tumbler rotates slowly, and as it rotates the strings, with the air blast still directed over and through them, break up into short lengths and fall either directly into a cooling and drying vat 20, or onto a conveyor or chute 21 leading to it. In some cases, I omit the chute 21 and have the vat 20 directly under the tumbler. The bottom of the vat 20 is a perforated screen through which a blast of air is directed from a blower 22, the air being distributed so that it comes up uniformly through the perforations in the bottom. This blower supplies air at room temperature to both the vat 20 and nozzle 18. Air is blown through the bottom of the vat and the soft pellets in it until they are cooled and surface dried. The vats 20 are quite shallow and usually the pellets will not exceed a uniform depth of 5 to 6 inches. The pellets are turned over in the vat from time to time if necessary to produce uniform cooling and drying and prevent sticking. This preliminary drying and cooling usually takes from ½ to ¾ hour, the time being variable due to variations in room temperatures, humidity, and volume of pellets being cooled.

When the pellets are surface dried, they are transferred to a second vat 23 having a perforated bottom through which a blast of hot air is directed from a blower 24, the air being warmed to a temperature of 150 to 180 degrees or more by heating coils 25 located in the air passage between the blower and drying vat. Hot air is blown through the pellets, and they are turned over if required, until they are thoroughly dried, or dried sufficiently for efficient toasting, usually down to about 10% moisture or less. This usually takes from 1 to 1½ hours.

The dried pellets are then fed to the hopper 26 from which they flow at a controlled rate into the upper end of a rotating cylindrical oven 27 from which they emerge at 28 fully toasted. The oven is maintained at a uniform temperature during the toasting, usually not lower than 350 degrees nor higher than 450 degrees, and the time for toasting will run between 2½ and 5 minutes.

The toasted pellets may fall from the oven into bins or containers from which they will be packed in moisture proof containers when cool. Or the oven chute 28 may deliver to a cooling belt 29 on which the pellets will be cooled or to vats or bins having perforated bottoms through which cooling air is blown similar to vats 20, 23 before delivery to the hopper 30 of an automatic packaging machine.

While I have shown the cooling and drying vats 20, 23 and hopper 26 disconnected, my process contemplates in its more efficient carrying out, that the cooling and drying will be accomplished in a continuous step on a slowly moving perforated conveyor between the tumbler 19 and hopper 26 or by means of a cooling and drying tower. In that case, the first part of the conveyor or cooling tower will receive cool air as from a blower 22, and the rest of the conveyor or cooling tower will receive hot air as from the blower 24.

I have shown separate vats 20, 23 for the cooling and drying of the pellets, but the entire process of cooling and drying may be carried on in a single vat. In that case a by-pass is provided around the heater 25 so that a single blower 24 may first blow cool air through the mass until it is cooled and surface dried, after which, by shifting dampers, the blower will deliver air through the heater 25 to complete the drying.

In Figs. 4 and 4—A, I have illustrated how my process may be carried out continuously from the milling of the bran through all stages up to and including the drying of the bran pellets.

The bran is re-milled in a mill 5, similar to that shown in Fig. 1—A, and the finely milled bran is carried by a conveyor 9 up to a screw mixer 11 which extends over a battery of three cookers 12. The flavoring and binding material from a reservoir 13 is fed into the mixer 11 so that it mixes with the bran being fed to the cookers. The battery of three cookers are used in succession so that the process of cooking is continuous.

The mixer 11 has three outlets 32, 33, 34 controlled by gates 35, 36, 37, one being over each of the rotating cookers 12. When one of the gates, as 35, is open, the bran mixture will be fed into the cooker 12 directly beneath it, and similarly with the other two gates and cookers.

Each of the cookers is adapted to discharge its cooked contents into a trough 15, which in turn delivers the cooked mass to a conveyor 38 which carries it to the hopper of the extruding machine 17. The extruded strings are delivered into a rotating screen 19 and a blast of cold air is blown through them from a nozzle 18, just the same as in Fig. 1—A.

The strings of cooked bran broken into small pellets drop through a rotating screen 19 onto a vibrating screen 39 through which a blast of cool air is directed from the distributor 40 which is supplied with air through the inlet pipe 41. The vibrating screen 39 is inclined toward a conveyor 42 and the vibration of the screen causes the bran pellets to travel along it toward the conveyor onto which they drop. The conveyor 42 may be a belt conveyor if its inclination is not too great or it may be provided with cleats, as illustrated, where its slope is considerable. The delivery end of the conveyor 42 discharges the pellets into the upper end of a cooling and drying tower 43. This tower will be of sufficient height, usually two or three stories, so that as the pellets pass down through it they are thoroughly dried. Two opposite sides of the tower are provided with slots or louvres 44 through which the cooling and drying air that is supplied to the tower may escape.

The bran pellets leaving the conveyor 42 fall upon a spreader 45 at the top of the tower, which spreads the pellets out in two layers and directs them toward the two opposite sides. Within the tower and adjacent to the louvres are perforated screens or baffles 46 onto which the pellets drop and through which air is directed.

As the pellets leave the spreader 45 they drop onto the screens or baffles 46 through which a blast of cooling air is first directed from the air inlet 47, the air passing through the descending pellets and escaping between the louvres 44. The pellets drop onto successive screens or baffles with the air continually blowing over and about them until they reach the bottom of the cooler, by which time they are dried sufficiently to go to the toaster, the moisture content at this time usually being about 10%.

The cooling tower is divided by partitions 48, 49 and 50 into two or more sections 51, 52, 53, 54. In the upper section 51, cool air is supplied through the inlet 47, while in the sections 52, 53, 54 hot air is supplied through the inlets 55, 56, 57.

When the pellets leave the bottom of the cooling chamber they are discharged onto a conveyor 58 which carries them to an elevator 59, which in turn discharges the dried pellets onto a vibrating screen 60. This screen is of coarse enough mesh to let the individual pellets fall through but will retain any lumps or masses of the pellets that are stuck together. If any of the pellets do stick together they are removed from the screen 60 and broken up by any suitable mill, such as the usual form of cob mill.

From the screen 60, the dried pellets drop into tempering bins 61 in which they may be held for two to four hours or longer if necessary to allow the pellets to become thoroughly uniform in moisture content. It usually is not necessary to store the dried pellets in the tempering bin 61 but they may be thus stored if it is found desirable or in case their moisture content is not uniform upon leaving the drying tower.

In case the tempering bins 61 are not used, the pellets from the screen 60 may pass directly into the hopper 26 of the rotating cooker, as illustrated in Fig. 1—C. If the bins are used, the bins are then wheeled directly over the hopper 26 of the rotating cooker and their contents discharged thereto. After being formed and dried by the apparatus illustrated in Figs. 4 and 4—A, the pellets are toasted in a rotating oven, like that shown in Fig. 1—C. They are then ready for packing as soon as they have been cooled.

The toasted pellets leaving the oven are crisp, crunchy and of pleasing flavor. Each particle of bran is coated with candied or hardened sugar, fruit syrup and malt which cements them together in the pellet and forms an edible coating which however is resistant to moisture.

The pellets, from the time they leave the tumbler and in finished form, are short more or less irregular bodies whose surface exhibits a multitude of tiny particles, that are coated with the binding and flavoring material. Under the microscope, the individual particles can be seen clearly, and the pellets are seen to have a rather rough scaly surface and irregular ends where the strings were broken. Figs. 2 and 3 are drawings showing the characteristic appearance of a pellet when magnified several diameters. There are no interstices between particles, but each pellet is an agglutinated mass of tiny particles and fibers, lying in all planes, and stuck together by the coating formed from the flavoring material, the size of the bran particles being less than the thickness of the pellets, as shown.

While these pellets are resistant to moisture, the avidity of the finely ground bran for water is restored by mastication which breaks up the coating and exposes the bran particles. It will thus be seen that I have produced bran in a form that is not only palatable and non-irritating but also has an increased laxative effect because of its increased bulk and water absorption. Another factor contributing to the increased laxative effect is the larger percentage of fiber in my product as compared with other commercial bran foods. With my process I am able to use, and preferably do use, bran that is substantially free from flour, while all other bran foods contain a considerable percentage of flour that reduces their fiber content and consequently their laxative effect. The pellets produced by my invention have a fiber content averaging much greater than any other bran food now on the market and many times greater than some.

I have shown the cooked bran mixture as going directly from the cookers to the extruder where it is formed into strings while still hot, and usually I prefer to do this because the temperature at which the cooked mass is extruded has a marked effect on the hardness and density of the finished pellets. Also the extruded strings are less tacky and easier to break up into pellets, when formed from a hot mass. If the mass is cooled before extrusion, it requires a greater pressure to form the strings which therefore, are much denser and produce harder, crisper pellets. Also the relatively cool strings coming from the extruder are much more sticky or tacky than hot strings and tend to mat together in or before reaching the rotating screen. Pellets made from a hot cooked mass are lighter, softer and more readily absorb liquid than pellets made from a relatively cool mass, and usually I prefer the softer pellets, but the invention is not limited thereto. The strings when extruded while hot expand or puff on leaving the extruding die which makes the pellets lighter and somewhat porous.

The process of this invention is not limited to the preparation of a bran food but may be applied to the production of other cereal foods as whole wheat, oats, corn, rice, etc. Also, the bran need not be made in the form of cylindrical pellets, but may be short lengths of flat strips or ribbons, or irregular granular pellets.

This application is in part a continuation of my application, Ser. No. 248,650, filed December 31, 1938.

While I have thus illustrated and described how my process may be carried out, the apparatus for doing it, and the product produced, it is understood that the terms, equipment, ingredients, and quantities used herein are but illustrative of one means and process for carrying out the invention.

What I claim is:

1. A toasted cereal food pellet of cylindrical form consisting essentially of finely milled bran and an edible water-resistant binding material, the bran particles being coated with and bound together throughout the pellet by the binding material and the surface of the pellet consisting of a multitude of fine brand particles that are coated with the binding material and visible on the surface, the finely milled bran being more absorbent of moisture and less irritating to the digestive tract than unmilled bran.

2. The process of forming a bran product in small pellets which comprises milling the bran to fine particles, mixing the fine bran with a water solution of an agglutinating flavoring material, cooking the mixture under steam pressure, extruding the hot cooked mass in a plurality of continuous strings, directing a blast of air through and about the mass of strings as they are extruded, dividing the strings into small pellets, continuing a blast of air about the strings after they are extruded and while being reduced to pellets, surface drying the pellets by cool air, continuing the drying of the pellets by heated air, and toasting the dried pellets.

3. The process of forming a bran cereal product in small pellets which comprises cooking a mixture of finely milled bran and flavoring material under steam pressure until it becomes adherent, extruding the cooked material in a plurality of strings, directing a blast of air about and through the mass of strings as they are extruded to prevent their matting together, thereafter tumbling the strings and directing an air blast about the tumbling strings until they are broken into lengths to form the pellets, and fall from the tumbler.

4. The process of forming a bran product in small pellets which comprises milling the bran to fine particles, cooking the bran with a water solution of an agglutinating flavoring material under steam pressure until it forms a soft mass, extruding the cooked mass to form a plurality of strings, directing an air blast about the strings as they are extruded, thereafter tumbling the strings and continuing an air blast about them to break the strings into small pellets, cooling and drying the pellets by air currents directed about them, and toasting the dried pellets.

5. The method of forming into pellets a soft tacky, cooked cereal product consisting essentially of finely milled bran which comprises extruding the cereal product in a plurality of horizontal strings and directing an air current diagonally upward and along the length of the strings to prevent their sticking together, thereafter tumbling the strings in an open mesh tumbler and continuing the air current thereabout, whereby the tumbling and air current break the strings into pellets so that they fall through the open mesh tumbler.

6. The process of producing a bran food in pellet form which comprises milling bran flakes to break them up into small particles, mixing the particles with a flavoring solution containing sugar, cooking the mixture under steam pressure, extruding the cooked mass by pressure into continuous strings, breaking the strings into small pellets, drying the pellets, and toasting the dried pellets whereby the sugar and flavoring material will form a coating of binding material on the bran particles.

7. The process of forming a cereal product into small pellets which comprises forming the cereal product into a plurality of continuous strings, delivering them onto an open mesh movable screen having a mesh not less than the maximum length of pellet, directing an air blast about the strings as they are being delivered to and while on the screen to prevent their matting together, moving the screen to break the strings into lengths to fall through the meshes and form the pellets, drying the pellets, and toasting the dried pellets.

8. The process of forming a bran product in small pellets which comprises mixing the bran with a water solution of an agglutinating flavoring material, cooking the mixture by steam until it forms a soft mass, delivering the hot cooked mass to an extruding machine, extruding the hot mass in a plurality of continuous strings, delivering the strings to a moving screen, directing an air blast about the strings as they emerge from the extruding machine and are delivered to the movable screen, moving the screen to break the strings into small pellets that fall through the screen, delivering the small pellets to cooling and drying apparatus, directing cooling air about the pellets to cool and surface dry them, then directing heated air about the pellets to complete the drying, and toasting the dried pellets.

EUGENE H. McKAY.

CERTIFICATE OF CORRECTION.

Patent No. 2,339,418.  January 18, 1944.

EUGENE H. McKAY.

It is hereby certified that error appears in the printed specification of the above numbered patent requiring correction as follows: Page 1, first column, line 22, for the words "together with" read --together by--; page 2, first column, line 18, for "thin" read --thing--; and second column, line 20, for "They they" read --Then they--; page 4, first column, line 33, for "up" read --apart--; and second column, line 44, strike out "puff" and insert instead --increase in diameter--; line 69, claim 1, for "brand" read --bran--; and that the said Letters Patent should be read with this correction therein that the same may conform to the record of the case in the Patent Office.

Signed and sealed this 11th day of April, A. D. 1944.

(Seal)

Leslie Frazer

Acting Commissioner of Patents.